US009060331B2

(12) United States Patent
Verma et al.

(10) Patent No.: US 9,060,331 B2
(45) Date of Patent: Jun. 16, 2015

(54) HOME VIRTUAL LOCAL AREA NETWORK IDENTIFICATION FOR ROAMING MOBILE CLIENTS

(71) Applicant: Aruba Networks, Inc., Sunnyvale, CA (US)

(72) Inventors: Ravinder Verma, San Jose, CA (US); Ramsundar Janakiraman, Sunnyvale, CA (US); Srinivasan Jayarajan, Bangalore (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 13/968,276

(22) Filed: Aug. 15, 2013

(65) Prior Publication Data

US 2014/0119354 A1    May 1, 2014

Related U.S. Application Data

(63) Continuation of application No. 13/664,330, filed on Oct. 30, 2012, now Pat. No. 8,514,828.

(51) Int. Cl.
*H04L 12/28* (2006.01)
*H04W 40/20* (2009.01)
*H04L 12/46* (2006.01)
*H04W 8/08* (2009.01)
*H04L 29/12* (2006.01)

(52) U.S. Cl.
CPC ........... *H04W 40/20* (2013.01); *H04L 12/4633* (2013.01); *H04L 12/4645* (2013.01); *H04W 8/085* (2013.01); *H04L 61/103* (2013.01); *H04L 61/2015* (2013.01)

(58) Field of Classification Search
None
See application file for complete search history.

(56) References Cited

U.S. PATENT DOCUMENTS

| 6,915,325 | B1 * | 7/2005 | Lee et al. | 709/202 |
| 7,447,188 | B1 * | 11/2008 | Dommety et al. | 370/342 |
| 8,514,828 | B1 * | 8/2013 | Verma et al. | 370/338 |
| 2004/0095932 | A1 | 5/2004 | Astarabadi et al. | |
| 2004/0221042 | A1 | 11/2004 | Meier | |
| 2007/0115899 | A1 * | 5/2007 | Ovadia et al. | 370/338 |
| 2009/0141729 | A1 | 6/2009 | Fan | |

OTHER PUBLICATIONS

S. Glass, Sun Microsystems, M. Chandra, Cisco Systems, Network Working Group, Request for Comments: 3543, Category: Standards Track, "Registration Revocation in Mobile IPv4", Aug. 2003, 29 pages, http://www.ietf.org/rfc/rfc3543.txt.

(Continued)

*Primary Examiner* — Duc C Ho
(74) *Attorney, Agent, or Firm* — Ying Wang

(57) ABSTRACT

The present disclosure discloses a method and network device for home VLAN identification for roaming mobile clients. Specifically, the disclosed method and system detects that the mobile client has roamed away from a first network to a second network, maintains a mapping between a virtual local area network (VLAN) corresponding to the mobile client and a tunnel corresponding to a foreign agent in the second network, and forwards packets to or from the mobile client on the VLAN based on the mapping between the VLAN and the tunnel via which the packets are received. Therefore, the disclosed method and system allows for identification of home VLANs for roaming mobile clients without merging VLAN policy configurations at the home agent and the foreign agent.

24 Claims, 8 Drawing Sheets

(56) References Cited

OTHER PUBLICATIONS

C. Perkins, Ed., Nokia Research Center, Network Working Group, Request for Comments: 3344, Obsoletes: 3220, Category: Standards Track, "IP Mobility Support for IPv4", Aug. 2002, 86 pages, http://www.ietf.org/rfc/rfc3344.txt.

C. Perkins, Ed., Nokia Research Center, Network Working Group, Request for Comments: 3220, Obsoletes: 2002, Category: Standards Track, "IP Mobility Support for IPv4", Jan. 2002, 85 pages, http://www.ietf.org/rfc/rfc3220.txt.

G. Dommety, K. Leung, Cisco Systems, Network Working Group, Request for Comments: 3115, Obsoletes: 3025, Category: Standards Track, "Mobile IP Vendor/Organization-Specific Extensions", Apr. 2001, 8 Pages, http://www.ietf.org/rfc/rfc3115.txt.

P. Calhoun, Sun Microsystems Laboratories, C. Perkins, Nokia Research Center, Network Working Group, Request for Comments: 2794, Updates: 2290, Category: Standards Track, " Mobile IP Network Access Identifier Extension for IPv4", Mar. 2000, 8 pages, http://www.ietf.org/rfc/rfc2794.txt.

U.S. Appl. No. 13/664,330, Notice of Allowability, mailed Apr. 22, 2013.

* cited by examiner

| MAC 410 | VLAN 420 | ASSIGNED VLAN 430 | DESTINATION 440 | FLAGS 450 |
|---|---|---|---|---|
| 00:18:DE:65:E1:2D | 4095 | 624 | TUNNEL1 | PM |
| 00:18:DE:65:E1:2D | 624 | 624 | TUNNEL1 | PM |
| 00:18:DE:65:E1:2E | 4095 | 12 | TUNNEL2 | PM |
| 00:18:DE:65:E1:2E | 12 | 12 | TUNNEL2 | PM |
| … … | … … | … … | … … | … … |

FIG. 4A

| MAC 460 | VLAN 470 | ASSIGNED VLAN 480 | DESTINATION 490 | FLAGS 495 |
|---|---|---|---|---|
| 00:18:DE:65:E1:2D | 623 | 623 | TUNNEL100 | PM |
| 00:18:DE:65:E1:2D | 4095 | 623 | TUNNEL100 | PM |
| … … | … … | … … | … … | … … |

FIG. 4B

| MAC 610 | VLAN 620 | ASSIGNED VLAN 630 | DESTINATION 640 | FLAGS 650 |
|---|---|---|---|---|
| 00:18:DE:65:E1:2D | 623 | 623 | TUNNEL10 | PM |
| ... ... | ... ... | ... ... | ... ... | ... ... |

FIG. 6A

| MAC 660 | VLAN 670 | ASSIGNED VLAN 680 | DESTINATION 690 | FLAGS 695 |
|---|---|---|---|---|
| 00:18:DE:65:E1:2D | 623 | 623 | TUNNEL20 | PM |
| 00:18:DE:65:E1:2D | 624 | 623 | TUNNEL20 | PM |
| ... ... | ... ... | ... ... | ... ... | ... ... |

FIG. 6B

HOME VIRTUAL LOCAL AREA NETWORK IDENTIFICATION FOR ROAMING MOBILE CLIENTS

PRIORITY CLAIM; INCORPORATION BY REFERENCE

This application is a Continuation of U.S. patent application Ser. No. 13/664,330 filed on Oct. 30, 2012, the entire content of which is hereby incorporated by reference.

FIELD

The present disclosure relates to wireless mobility. In particular, the present disclosure relates to home virtual local area network (VLAN) identification for roaming mobile clients in wireless networks.

BACKGROUND

Mobile IP protocol is an Internet Engineering Task Force (IETF) standard communications protocol. Mobile IP protocol allows mobile clients to move from one network to another network while maintaining the same Internet Protocol (IP) address. Usually, each mobile client is identified by its home address regardless of its current location. While away from its home network, the mobile client is associated with a care-of address which identifies its current location and its home address is associated with the local endpoint of a tunnel to its home agent. Thus, Mobile IP protocol specifies how a mobile client registers with its home agent and how the home agent routes datagrams to the mobile client through the tunnel.

Conventionally, mobility in the network layer has been achieved with Internet Protocol in Internet Protocol (IPIP) tunnels, which carry only the Internet Protocol (IP) payload between a home agent and a foreign agent in a wireless network. Original physical layer headers are not carried across the tunnel. Thus, the only means of identifying the client will be based on the IP address.

Also, the traffic has to be routed once the packets reach the home agent. Such routing by the home agent introduces at least the following issues: First, it requires routing to be enabled by the home agent, where the mobile client was initially associated with, on its home virtual local area network (VLAN). Second, when packets are routed using the best route on the home agent, the routed traffic could leave the home agent on a different VLAN than the home VLAN of the home agent. Third, when network layer broadcast or multicast traffic from a roaming mobile client is received by the home agent, the VLAN used to forward the traffic has to be decided implicitly based on reverse route lookup by the source IP address or client IP address of the packet.

On the home agent, if the traffic is routed on a different VLAN than the home VLAN, it may potentially allow guest traffic on a different VLAN that is not the home VLAN of the home agent. This can cause traffic to be black-holed due to the following reasons: First, the receiving router can have antispoofing access control lists (ACLs) that are configured to determine which packets are to be dropped based on whether the source IP corresponds to the incoming VLAN subnet.

Second, the receiving router has virtual routing and forwarding (VRF) configured, and thus could prevent guest traffic from being forwarded outside a specific VRF path. Home VLAN has been configured to perform source NAT on the traffic forwarded out of the vlan. If the traffic is not forwarded from the Home Vlan, the home agent may fail to source NAT the packet.

Moreover, conventional mobility implementations trap DHCP messages from the mobile client and play them back on the home VLAN on behalf of the mobile client. This also ensures that DHCP transaction does not get transmitted on a foreign VLAN, because transmitting DHCP transaction on a foreign VLAN would result in the mobile client changing its IP address. When implemented in control plane, the conventional mobility implementations do not scale when a high density of mobile clients roam during the same time period. When a mobile client roams away from its home agent, the DHCP packets are relayed from the foreign agent to the home agent. Therefore, the relay process introduces undesirable latency, since the same packets have to travel multiple hops before making to their final destination.

BRIEF DESCRIPTION OF THE DRAWINGS

The present disclosure may be best understood by referring to the following description and accompanying drawings that are used to illustrate embodiments of the present disclosure.

FIGS. 4A-4B illustrate exemplary bridge tables used by home agent and/or foreign agent to determine VLAN configurations according to embodiments of the present disclosure.

FIGS. 6A-6B illustrate exemplary bridge tables used by home agent and/or foreign agent to determine VLAN configurations according to embodiments of the present disclosure.

DETAILED DESCRIPTION

In the following description, several specific details are presented to provide a thorough understanding. While the context of the disclosure is directed to home VLAN identification for roaming clients, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to wireless mobility. In particular, the present disclosure relates to home virtual local area network (VLAN) identification for roaming mobile clients.

According to embodiments of the present disclosure, a disclosed network device detects that the mobile client has roamed away from a first network to a second network, maintains a mapping between a virtual local area network (VLAN) corresponding to the mobile client and a tunnel corresponding to a foreign agent in the second network, and forwards packets to or from the mobile client on the VLAN based on the mapping between the VLAN and the tunnel via which the packets are received. Therefore, the disclosed method and system allows for identification of home VLANs for roaming mobile clients without merging VLAN policy configurations at the home agent and the foreign agent.

Current Inter-Control Device Roaming

Figure 1:
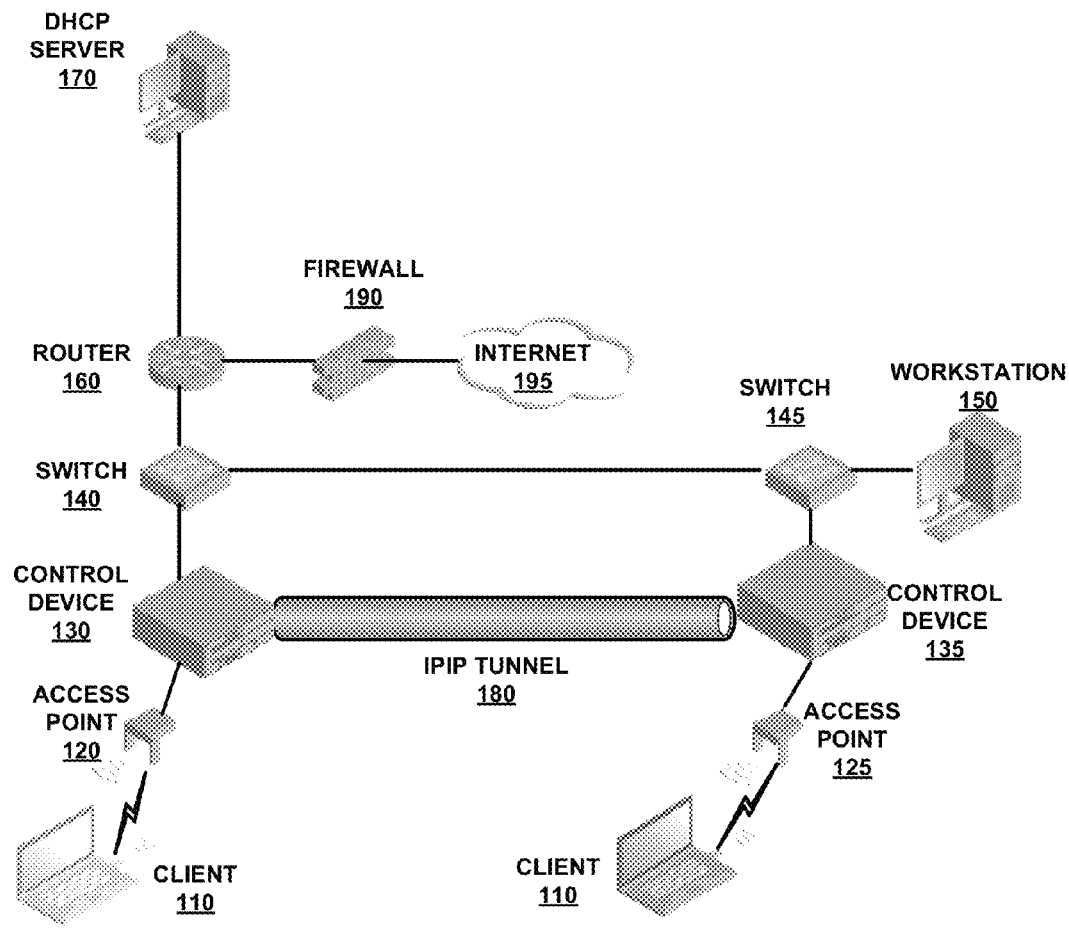
FIG. 1 is a diagram illustrating an exemplary wireless network environment according to embodiments of the present disclosure.

FIG. 1 shows an exemplary wireless digital network environment according to embodiments of the present disclosure. FIG. 1 includes at least a home control device 130 and a foreign control device 135. Home control device 130 is interconnected with switch 140; and, foreign control device 135 is interconnected with switch 145. Home or foreign control device 130/135 supports network control capabilities, for example, stateful network security policy enforcement, spectrum analyzer, wireless intrusion protection, secure remote connectivity, advanced cryptography, adaptive radio management to optimize wireless mobile client behaviors, etc.

Network switch 140/145 is a computer networking device that connects network segments or network devices. Network switch 140 or 145 may include a multi-port network bridge that processes and routes data at the data link layer (e.g., layer 2 of the OSI model), or switches that additionally process data at the network layer (e.g., layer 3 of the OSI model).

Furthermore, switch 140 can be connected to router 160, which can forward traffic to and receive traffic from Internet 195. Router 160 generally is a network device that forwards data packets between different networks, and thus creating an overlay internetwork. A router is typically connected to two or more data lines from different networks. When a data packet comes in one of the data lines, the router reads the address information in the packet to determine its destination. Then, using information in its routing table or routing policy, the router directs the packet to the next/different network. A data packet is typically forwarded from one router to another router through the Internet until the packet gets to its destination.

Firewall 190 can optionally be configured to police traffic to/from Internet 195. In some embodiments, security policies can be configured at firewall 190 to dictate the network access, protocols, and applications that are permitted or denied, as well as levels of network services that are provided. Such security policies can be actively enforced in a mobile environment with policies enforced upon mobile clients as they roam within one or more mobility domains in wireless networks.

Moreover, assuming that home access point 120 is interconnected with home control device 130, and foreign access point 125 is interconnected with foreign control device 135. In this example, for illustration purposes only, assuming that client 110 initially is associated with home access point 120, and later roams to associate with foreign access point 125. Access point 120 or 125 generally refers to a network device that allows wireless clients to connect to a wired network. Access points usually connect to a router via a wired network or can be a part of a router in itself.

Also, router 160 maybe connected directly or indirectly with a Dynamic Host Configuration Protocol (DHCP) server 170. DHCP server 170 maintains a database of available IP addresses and configuration information. When DHCP server 170 receives a request from a client, e.g., client 110, DHCP server 170 determines the network to which the DHCP client is connected, and then allocates an IP address or prefix that is appropriate for the DHCP client, and sends configuration information appropriate for that client.

As an example, assuming that client 110 is in communication with workstation 150 when client 110 roams from its home access point 120 to foreign access point 125. In order to maintain network layer connectivity, client 110 shall keep the same IP address after it roams to foreign access point 125. On the other hand, for each layer 3 packet destined to client 110 from workstation 150 received by switch 145, switch 145 shall be able to (1) identify the right VLAN for client 110 to forward the layer 3 packet to, and (2) determine where to forward the layer 3 packet to by performing a route lookup. Note that, in some embodiments, the home agent (e.g., home access point 120) and the foreign agent (e.g., foreign access point 125) are managed by different master control device, and thus the foreign agent may (e.g., foreign access point 125) not know the VLAN settings and/or configurations at the home agent (e.g., home access point 120).

In order to forward the layer 3 packet, according to one embodiment, after foreign access point 125 receives the packet from workstation 150, foreign access point 125 can encapsulate the layer 3 packet with a layer 3 header, and send the packet through an IP-IP tunnel 180 between control device 135 (which is connected to foreign agent) and control device 130 (which is connected to home agent). Home agent (e.g., home access point 120) then de-capsulates and forwards the layer 3 packet. Note that, home agent need to determine the VLAN associated with the incoming layer 3 packet prior to forwarding the packet.

In some embodiments, home agent can determine the corresponding VLAN by performing a route lookup on source IP address of the incoming layer 3 packet to determine the VLAN on which the packet shall be forwarded. This typically requires a network administrator to configure the VLAN mapping between mobile client's identifier and its corresponding VLAN identifier. In some embodiments, home agent can snoop DHCP packets in order to determine the VLAN identifier. In other embodiments, home agent may cache the VLAN information so that it can determine the VLAN identifier later. These solutions necessarily encompass network administration and complicated configurations.

Because IP-IP tunnel 180 does not carry original layer 2 headers from the client 110 while client 110 roams to associate with foreign access point 125. Also, the datapath and/or fastpath at the home agent are not aware of client 110's home VLAN. Hence, the home agent will be routing traffic from client 110 using its own default gateway. The IP-IP tunnel based design has the following limitations—

If client 110's default gateway is not same as the home agent's default gateway, VRF may be used in the upstream router. For example, VRF forwarding tables could prevent traffic from guest user (e.g. client 110 while associated with access point 125) being forwarded outside a specific VRF path leading to loss of connectivity.

In addition, if the default gateway for the home agent has anti-spoofing access control lists (ACLs) configured, it will drop packets whose source IP address do not match incoming interface subnet. If VLAN-based network address translation (NAT) is configured for the home VLAN, guest traffic cannot be source network address translated at the home agent because datapath is not aware of the home VLAN.

Furthermore, in case of inter controller IP mobility, authentication process usually can set of ACE/ACL entries for each mobile client to redirect network layer traffic to the IP-IP tunnel. Scalability limitations may arise when then number of guest clients increases.

Intrusion detection systems relying on ARP poisoning to quarantine a mobile client at a foreign agent will fail. This is because IPIP tunnels cannot carry ARP packets. Last but not least, existing model cannot be used for IPv6 mobility.

Enhanced Inter-Control Device Roaming

Figure 2:
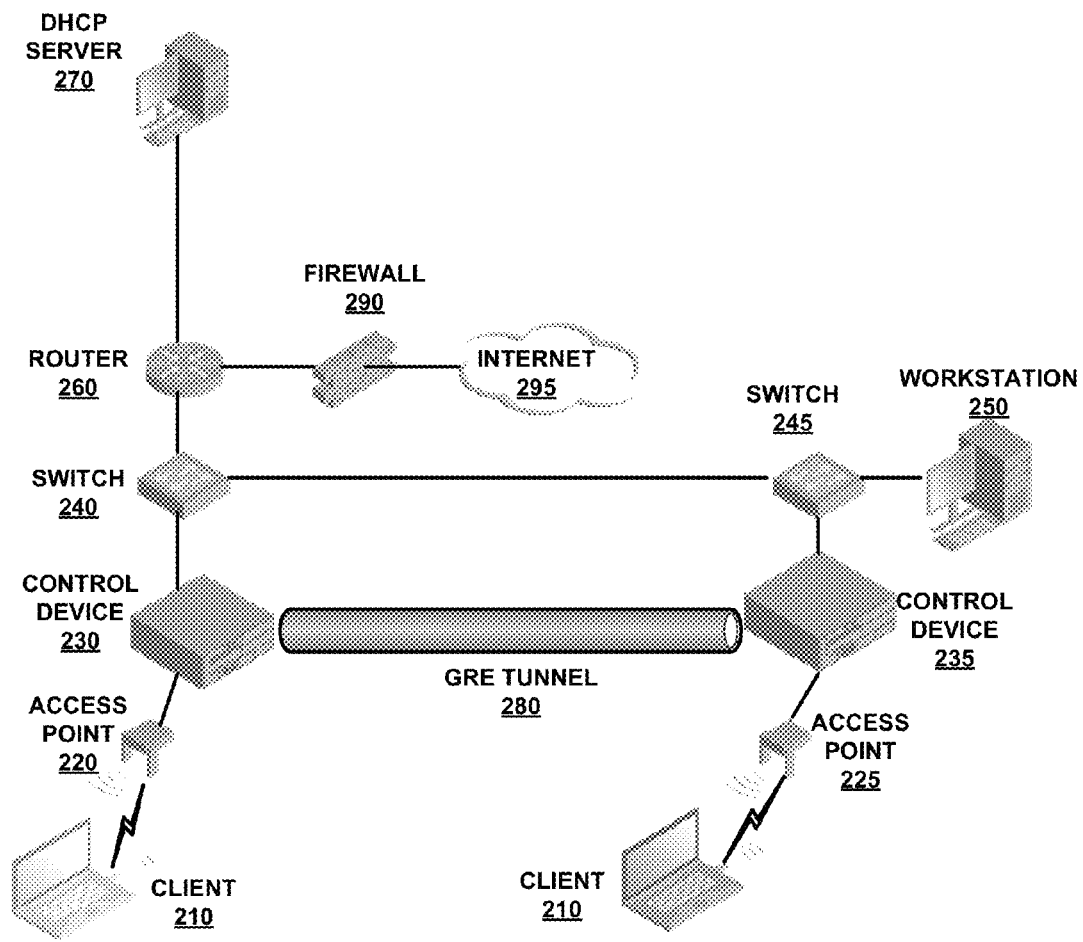
FIG. 2 is a diagram illustrating an exemplary wireless network environment according to embodiments of the present disclosure.

FIG. 2 illustrates exemplary network environment according to embodiments of the present disclosure. FIG. 2 includes at least a home control device 230 and a foreign control device 235. Home control device 230 is interconnected with switch 240; and, foreign control device 235 is interconnected with switch 245. Home control device 230 and/or foreign control device 235 supports network control capabilities. Network switch 240 or 245 is a computer networking device that connects network segments or network devices.

Furthermore, switch 240 can be connected to router 260, which can forward traffic to and receive traffic from Internet 290. Router 260 generally is a network device that forwards data packets between different networks. Firewall 290 can optionally be configured to police traffic to/from Internet 295. Moreover, in this example, it is assumed that home access point 220 is interconnected with home control device 230, and foreign access point 225 is interconnected with foreign control device 235. In this example, for illustration purposes only, assuming that client 210 initially is associated with home access point 220, and later roams to associate with foreign access point 225.

Also, router 260 maybe connected directly or indirectly with a Dynamic Host Configuration Protocol (DHCP) server 270. DHCP server 270 can receive a request from a client, e.g., client 210, determine the network to which the DHCP client is connected, and then allocate an IP address or prefix that is appropriate for the DHCP client.

For illustration purposes only, assuming that mobile client 210 is configured with an IP address of 10.16.23.10, MAC address of 00:18:DE:65:E1:2D, and a default gateway of 10.16.23.254. Furthermore, assuming that control device 230 is configured with an IP address of 10.16.28.10, and supports VLAN 623. Moreover, control device 235 is configured with IP address of 10.16.28.20, and supports VLAN 624. Here, VLAN 623 is configured as "10.16.23.1/24" and VLAN 624 is configured as "10.16.24.1/24." Also, assuming that VLAN 623 is the VLAN configured on home access point 220, and VLAN 624 is the VLAN configured on foreign access point 225.

Initially, mobile client 210 associates to home access point 220. Upon association, mobile client 210 will be assigned an IP address (e.g., 10.16.23.10) by DHCP server 270. VLAN 623 (e.g., 10.16.23.1/24) becomes the home VLAN for mobile client 210.

Assuming that client 210 is in communication with workstation 250 when client 210 roams from its home access point 220 to foreign access point 225. In order to maintain network layer connectivity, client 210 shall keep the same IP address (e.g., 10.16.28.10) after it roams to foreign access point 225.

According to some embodiments, a layer 2 Generic Routing Encapsulation (GRE) tunnel 280 is established between home agent and foreign agent. GRE tunnel 280 preserves physical layer headers in the packets transmitted from mobile client associated with a foreign agent to its home agent. The home agent can then bridge traffic from the layer 2 GRE tunnel to the correct home VLAN for the mobile client. Moreover, layer 2 GRE tunnel 280 can optionally be used for carrying other packets between the home agent and the foreign agent, for example, IPv6 packets, ARP packets, DHCP packets, etc.

In one example, after mobile client 210 roams from home access point 220 to access point 225, foreign control device 235 can determine that mobile client 210 initiated an inter-control device and inter-VLAN move. In other words, mobile client 210 is determined to be corresponding to a home agent at a different control device, whereas the home agent VLAN (e.g., VLAN associated with access point 220) is different from the foreign agent VLAN (e.g., VLAN associated with access point 225). Foreign control device 235 may determine so based on one or more of home agent discovery request, agent discovery request/response, mobile IP registration request/response, etc. Furthermore, foreign control device 235 can learn the home VLAN for mobile client 210 from such messages, e.g., the mobile IP registration response message in which the home VLAN is included as a vendor specific extension. Then, foreign control device 235 creates a layer 2 GRE tunnel 280 using the home agent's and foreign agent's respective switch IP addresses as the endpoints for the layer 2 GRE tunnel. Note that, packets transmitted over layer 2 GRE tunnel 280 will not have a VLAN tag. Rather, switch 240 will assign a VLAN identifier (e.g., zero or 4095) after decapsulating packets received from layer 2 GRE tunnel 280.

Figure 3:
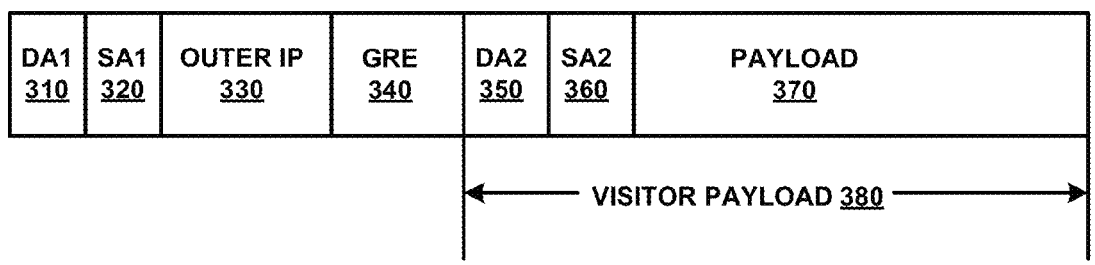
FIG. 3 illustrates an exemplary network packet according to embodiments of the present disclosure.

FIG. 3 illustrates an exemplary network packet transmitted in layer 2 GRE tunnel 280. The packet includes at least the following fields: DA1 310, SA1 320, Outer IP 330, GRE header 340, DA2 350, SA2 360, and payload 370. This is a typical packet format used for layer 2 GRE payload transmitted from a roaming mobile client in a foreign agent to its default gateway through the layer 2 GRE tunnel.

Here, DA1 310 indicates destination Media Access Control (MAC) address of the packet; SA1 320 indicates source MAC address of the packet. Furthermore, outer IP 330 includes a source IP address of the foreign agent and a destination IP address of the home agent. The field GRE 340 is configured with a custom type (e.g., "0x9010") and/or a flag that is used to differentiate trusted versus untrusted packets. Furthermore, DA2 350 indicates the MAC address of the default gateway for the mobile client or MAC address of a peer in the home VLAN or broadcast MAC; and, SA2 360 indicates the MAC address of the mobile client at the foreign agent. Payload 370 indicates user data of the packet.

A packet received from the roaming mobile client includes at least control information, such as DA2 350 and SA2 360 in the header, and user data information, such as payload 370. The foreign agent can then add GRE header 340, outer IP 330, SA1 320, and DA1 310 to the packet, whereas the portion of the packet, including at least DA2 350, SA2 360, and payload 370, is encapsulated as visitor payload 380.

In addition, the home agent and/or foreign agent will add or change its bridge entries accordingly upon various events, e.g., when the home agent receives a home agent discovery request, or when the foreign agent receives a registration response message, etc.

FIG. 4A illustrates an exemplary modified bridge table at the foreign agent. The table illustrated in FIG. 4A includes fields such as MAC 410, VLAN 420, assigned VLAN 430, destination 440, flags 450, etc. Specifically, MAC 410 corresponds to the source MAC address of a packet. Destination 440 indicates the interface through which the packet will be transmitted. Flag 450 identifies the owner of the bridge entry, may also indicate whether bridging for the mobile client shall be skipped.

Furthermore, VLAN 420 indicates the VLAN of the port and/or tunnel from which the packet is received, whereas assigned VLAN 430 indicates the home VLAN assignment. Note that, the home VLAN will be stored in assigned VLAN 430 field of the bridge entry. Assigned VLAN 430 field will be used to overwrite the default VLAN of a packet during source MAC bridge lookup in the datapath. This is not an issue even if VLAN is derived from authentication server and/or roles, because the home agent would delete the mobile client in derived VLAN when changing the bridge table. With this change in the bridge table, datapath is aware of the mobile clients' home VLANs, and thus can direct the traffic accordingly.

After the mobile client roams to a foreign access point, the disclosed system would determine that this is an inter controller inter VLAN move based on one or more of a home agent discovery, an agent discovery request or response message, a mobile IP registration request or response, etc. For example, the foreign agent can learn the roaming mobile client's home VLAN from the mobile IP registration response message, because the home VLAN is included in the registration response as a vendor specific extension. Thereafter, the foreign agent can create a layer 2 GRE tunnel using the home agent and the foreign agent's corresponding switch IP addresses as the tunnel endpoints. Packets traversing the tunnel will have their VLAN tag removed. Moreover, datapath will always assign a VLAN identifier (e.g., zero or 4095) after decapsulating packet from the L2 GRE tunnel.

In the example illustrated in FIG. 4A, assuming that two mobile clients of the home agent have roamed to the same foreign agent. Different layer 2 GRE tunnels may be established for the two mobile clients. However, all of the layer 2 GRE tunnels will be associated with a dedicated VLAN, e.g., VLAN 4095.

In this example, the first two entries in the first and second rows of the bridge table correspond to a first mobile client having MAC address "00:18:DE:65:E1:2D." The first entry would be used to bridge packets from the layer 2 GRE tunnel on to tunnel 1. The second entry will be used to bridge packets from VLAN 624 with destination MAC address corresponding to the first mobile client's MAC address.

Likewise, the next two entries in the third and fourth rows correspond to a second mobile client having MAC address "00:18:65:E1:3E;" etc. The third entry would be used to bridge packets from the layer 2 GRE tunnel on to tunnel 2. The fourth entry will be used to bridge packets from VLAN 12 with destination MAC address corresponding to the second mobile client's MAC address.

In addition to the bridge entries, ACL/ACE entries would be also changed at the foreign agent to redirect Address Resolution Protocol (ARP) and layer 3 packets from the mobile client through the layer 2 GRE tunnel. The changed ACL/ACE entries will be made as a part of a new role, and all visitors at the foreign agent destined to a particular layer 2 GRE tunnel may be assigned this new role.

FIG. 4B illustrates an exemplary modified bridge table at the home agent. The table illustrated in FIG. 4B includes fields such as MAC 460, VLAN 470, assigned VLAN 480, destination 490, flags 495, etc. Specifically, MAC 460 corresponds to the source MAC address of a packet. Furthermore, VLAN 470 indicates the VLAN of the port and/or tunnel from which the packet is received, whereas assigned VLAN 480 indicates the home VLAN assignment. Destination 490 indicates the interface through which the packet will be transmitted. Flag 495 identifies the owner of the bridge entry, may also indicate whether bridging for the mobile client shall be skipped.

When the home agent detects that the first mobile client has roamed away from the home agent, the home agent would add and/or change the first two entries of the bridge table. Specifically, the first entry would be used to bridge packets from VLAN 623 with destination MAC as client MAC. The second entry will be used to overwrite the VLAN of packets from the tunnel with the assigned VLAN.

In some embodiments, home agent can determine the corresponding VLAN by performing a route lookup on source IP address of the incoming layer 3 packet to determine the VLAN on which the packet shall be forwarded. This typically requires a network administrator to configure the VLAN mapping between mobile client's identifier and its corresponding VLAN identifier. In some embodiments, home agent can snoop DHCP packets in order to determine the VLAN identifier. In other embodiments, home agent may cache the VLAN information so that it can determine the VLAN identifier later.

Traffic that flows over the layer 2 GRE tunnel after the mobile client initiates the inter-controller roam typically include: Address Resolution Protocol (ARP) messages, unicast data packets, Dynamic Host Configuration Protocol (DHCP) messages, multicast Internet Group Management Protocol (IGMP) messages, multicast data packets, etc. The handling of each type of traffic flows is described in details below.

1. ARP Messages

ARP request from the roamed mobile client at the foreign agent will get redirected by role-based ACL through the layer 2 GRE tunnel. At the home agent, these packets will be decapsulated, assigned to a dedicated VLAN (e.g., VLAN 4095), and send to bridge LEARN code. The source based MAC lookup will overwrite VLAN 4095 with VLAN 623. Thus, the packet will be transmitted on VLAN 623 and its corresponding port based on the destination MAC lookup.

The home agent will serve as a proxy ARP using the actual roamed mobile client's MAC address for any ARP broadcast request sent by peer clients in VLAN 623 (e.g., a default gateway) at the home agent attempting to resolve the roamed mobile client's MAC address.

In addition, peer clients in VLAN 623 at the home agent attempting to resolve the roamed mobile client's MAC address and sending out an ARP request destined to the roamed mobile client's MAC address will succeed destination bridge lookup at the home agent. Thus, the ARP request will be transmitted over the layer 2 GRE tunnel to the foreign agent.

At the foreign agent, the received ARP packets will be assigned to a dedicated VLAN (e.g., VLAN 4095) after decapsulation from the tunnel and sent to bridging code. Destination MAC address lookup process at the foreign agent will send the ARP packet to the roamed mobile client over tunnel 1.

2. Unicast Data Packets

Unicast packets from the roamed mobile client on VLAN 624 will either have the gateway MAC address or the peer client MAC address as the destination MAC address. Therefore, these packets will be managed by the role-based dynamic ACLs that are configured for the user. As a result, these unicast packets will be redirected through the layer 2 GRE tunnel to the roamed mobile client at the foreign agent.

At the home agent, these packets will be assigned to a dedicated VLAN (e.g., VLAN 4095) and sent to bridge LEARN. Source based MAC lookup will overwrite VLAN 4095 with VLAN 623. Then, the packet will be transmitted on VLAN 623 and its corresponding port based on outcome of the destination MAC address lookup.

3. DHCP Messages

Broadcast DHCP packets destined to the roamed mobile client will be converted to unicast before a destination bridge lookup at the home agent. In some embodiments, instead of exchanging DHCP packets for the visitor between the home agent and foreign agent over the layer 2 GRE tunnel, these messages can be changed by the home agent and foreign agent using User Datagram Protocol (UDP) messages instead.

4. Multicast IGMP Messages

After the roam, the mobile IP process at the foreign agent will notify Protocol Independent Multicast (PIM) process at the foreign agent about active multicast groups for the visitor. The mobile IP process at the foreign agent learns about the MCG's at the home agent through, for example, a mobile IP registration reply message. Also, PIM at the foreign agent will send out an unsolicited report for the group if the roamed mobile client is the only member for the group.

Client IGMP control messages (e.g., IGMP report and leave) from the roamed mobile client in the foreign VLAN will be managed by the role-based dynamic ACLs that are configured for the user. Thus, these IGMP control message will be redirected through the layer 2 GRE tunnel. A copy of the IGMP control message will be sent to the PIM at the foreign agent for proxy join/leave.

5. Multicast Data Packets

Downstream multicast traffic for the roamed mobile client will directly reach the foreign agent, because the PIM at the foreign agent would have proxy joined on the roamed mobile client's MCGs.

Upstream multicast traffic from the roamed mobile client will follow the unicast model and will get redirect through the L2 GRE tunnel by role ACLs.

In some embodiments, authentication process creates one dynamic role and inserts three dynamic redirect ACL/ACE entries for each home agent and foreign agent pair. The dynamic role and the ACL entries will be flagged as system defined. Therefore, the dynamic role and the ACL entries will not be editable or saved in configuration. Furthermore, the eth-type ACL will be used to redirect ARP traffic and programmed as a standard_acl in datapath. Roaming mobile client at the foreign agent will be assigned the corresponding dynamic role to redirect ARP and network layer (L3) traffic through the data link layer (L2) GRE tunnel. For example, the following ACLs may be created for a roaming mobile client:

user any 0 0-0 0-0 L2-GRE-tunnel-id Forward-Redirect
any user 0 0-0 0-0 L2-GRE-tunnel-id Reverese-Redirect
any any 17 0-65535 67-67 (permit DHCP)
user any 0x806 0-0 0-0 etype permit Also, note that all traffic through the layer 2 GRE tunnel from the home agent to the foreign agent is marked as trusted. By contrast, all traffic from the foreign agent to the home agent is marked as untrusted. Whether a packet is "trusted" or "untrusted" is encoded in each packet by setting bits in the GRE header.

The layer 2 GRE tunnel used inter-controller IP mobility is not a part of any multicast group or VLAN flooding. Traffic is redirected through the layer 2 GRE tunnel only through explicit destination MAC address match based on bridge entries at the home agent and/or role-based ACLs at the foreign agent. Therefore, the mechanism disclosed herein will prevent loops the same way as if a layer 3 IP-IP tunnel is established.

Intra-Control Device Roaming Network Environment

Figure 5:
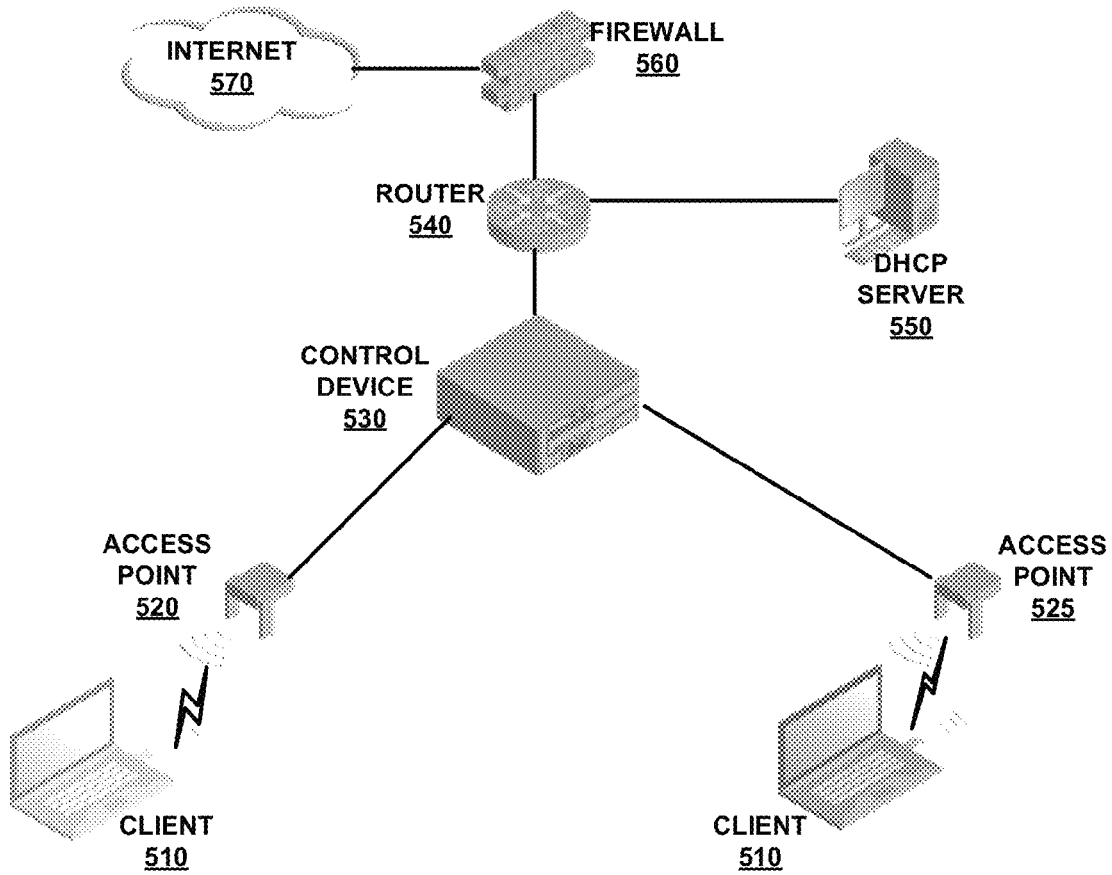
FIG. 5 is a diagram illustrating an exemplary wireless network environment according to embodiments of the present disclosure.

FIG. 5 illustrates an intra-control device roaming network environment according to embodiments of the present disclosure. FIG. 5 includes at least a home access point 520 and a foreign access point 525. Both home access point 520 and foreign access point 525 are interconnected with a control device 530, which may be a network switch and is further interconnected with router 540.

Router 540 generally is a network device that forwards data packets between different networks. Here, router 540 can forward traffic to and receive traffic from Internet 570. Firewall 560 can optionally be configured to police traffic to/from Internet 570. Also, router 540 maybe connected directly or indirectly with a Dynamic Host Configuration Protocol (DHCP) server 550. DHCP server 550 can receive a request from a client, e.g., client 510, determine the network to which the DHCP client is connected, and then allocate an IP address or prefix that is appropriate for the DHCP client.

For illustration purposes only, assuming that mobile client 510 is configured with an IP address of 10.16.23.10, MAC address of 00:18:DE:65:E1:2D, and a default gateway of 10.16.23.254. Furthermore, assuming that control device 530 is configured with an IP address of 10.16.28.10, and supports two VLAN interfaces—VLAN 623 is configured as "10.16.23.1/24" and VLAN 624 is configured as "10.16.24.1/24." Also, assuming that VLAN 623 is the VLAN configured on home access point 520, and VLAN 624 is the VLAN configured on foreign access point 525.

Initially, mobile client 510 associates to home access point 520. Upon association, mobile client 510 will be assigned an IP address (e.g., 10.16.23.10) by DHCP server 550. VLAN 623 (e.g., 10.16.23.1/24) becomes the home VLAN for mobile client 510.

FIG. 6A illustrates an exemplary bridge table at the control device. FIG. 6A includes fields such as MAC 610, VLAN 620, assigned VLAN 630, destination 640, flags 650, etc. Specifically, MAC 610 corresponds to the source MAC address of a packet. Furthermore, VLAN 620 indicates the VLAN of the port and/or tunnel from which the packet is received, whereas assigned VLAN 630 indicates the home VLAN assignment. Destination 640 indicates the interface through which the packet will be transmitted. Flag 650 identifies the owner of the bridge entry, may also indicate whether bridging for the mobile client shall be skipped. After mobile client associates with home access point 520 and is assigned an IP address, control device 530 will insert a permanent bridge entry for mobile client 510 with the destination as tunnel 10 to home access point 520 as shown in FIG. 6A.

FIG. 6B illustrates an exemplary bridge table at the control device. FIG. 6B includes fields such as MAC 660, VLAN 670, assigned VLAN 680, destination 690, flags 695, etc. Specifically, MAC 660 corresponds to the source MAC address of a packet. Furthermore, VLAN 670 indicates the VLAN of the port and/or tunnel from which the packet is received, whereas assigned VLAN 680 indicates the home VLAN assignment. Destination 690 indicates the interface through which the packet will be transmitted. Flag 695 identifies the owner of the bridge entry, may also indicate whether bridging for the mobile client shall be skipped.

After mobile client 510 roams to foreign access point 525, control device 530 will determine that mobile client 510 initiates an intra-controller inter-VLAN move based on one or more of the DHCP transaction, home agent discovery message, and/or mobile IP registration request and/or response messages, etc. Control device 530 will next insert or change two bridge entries as shown in FIG. 6B. Subsequent DHCP request and/or response messages for mobile client 510 will be transmitted over the appropriate VLAN.

Traffic that needs to be bridged after mobile client 510 initiates the intra-controller roaming typically includes, but is not limited to, Address Resolution Protocol (ARP) messages, unicast data packets, Dynamic Host Configuration Protocol (DHCP) messages, multicast Internet Group Management Protocol (IGMP) messages, multicast data packets, etc. The handling of each type of traffic flows is described in details below.

1. ARP Messages

ARP request from the roamed mobile client, e.g., on VLAN 624 will succeed a source MAC address bridge lookup. The assigned VLAN in the bridge entry (e.g., VLAN 623) will overwrite the incoming VLAN in the ARP request (e.g., VLAN 624). Therefore, the ARP request will be transmitted out on VLAN 623 and its corresponding port based on the results of destination MAC address lookup.

Peer mobile clients in home VLAN of the client (e.g., the default gateway in VLAN 623), which attempts to resolve the roamed mobile client's MAC address and sends out an ARP broadcast request message, will be transmitted by the controller via an ARP proxy with the actual roamed client's MAC address.

Note that, proxy Address Resolution Protocol (proxy ARP) is a technique by which a device on a given network answers the ARP queries for a network address that is not on that network. The ARP Proxy is aware of the location of the traffic's destination, and offers its own MAC address in reply. The captured traffic typically is routed by the ARP proxy to the intended destination via another interface or via a tunnel.

2. Unicast Data Packets

Unicast packets from the roamed mobile client on foreign VLAN (e.g., VLAN 624) will either have the gateway MAC address or the peer client MAC address as the destination MAC address. The source MAC address bridge lookup will overwrite the VLAN information in the packet (e.g., VLAN 624) with the assigned VLAN (e.g., VLAN 623) in the bridge entry.

Unicast packets from the home VLAN (e.g., VLAN 623) destined to the client's MAC address will succeed destination address bridge lookup, and therefore be transmitted over tunnel 20 to the roamed mobile client. Broadcast packets in the home VLAN of the mobile client (e.g., VLAN 623) will not reach the roamed mobile client because tunnel 20 is not a part of the home VLAN (e.g., VLAN 623) multicast group.

3. DHCP Message

Broadcast DHCP packets destined to the roamed mobile client will be converted to unicast before performing a destination address bridge lookup at the control device. Alternatively, DHCP packets can be transmitted to mobile IP process by datapath and forwarded on the right VLAN when network layer (L3) mobility is enabled.

4. Multicast IGMP Message

After the mobile client roams, mobile IP will notify PIM process at control device so that it can locate the mobile client and update destination to new egress (e.g., tunnel 20 instead of tunnel 10). Client IGMP control messages, e.g., IGMP report message, IGMP leave message, etc., from the mobile client in the foreign VLAN will succeed a source MAC address bridge lookup. Therefore, the assigned VLAN (e.g., VLAN 623) will overwrite the VLAN information carried in the packet (e.g., VLAN 624). Subsequently, the PIM process at the control device will receive the client IGMP messages on the home VLAN (e.g., VLAN 623), and perform a proxy join and/or a proxy leave action accordingly.

5. Multicast Data Packets

Downstream multicast traffic for the roamed client will reach the client as PIM would have registered AP2-WIFI-tunnel as part of VLAN 623 multicast group. Upstream multicast traffic from the roamed client will follow the unicast model, where in the packet VLAN will be overwritten by the assigned VLAN in bridge entry.

Processes for Home VLAN Identification for Roaming Mobile Clients

Figure 7:
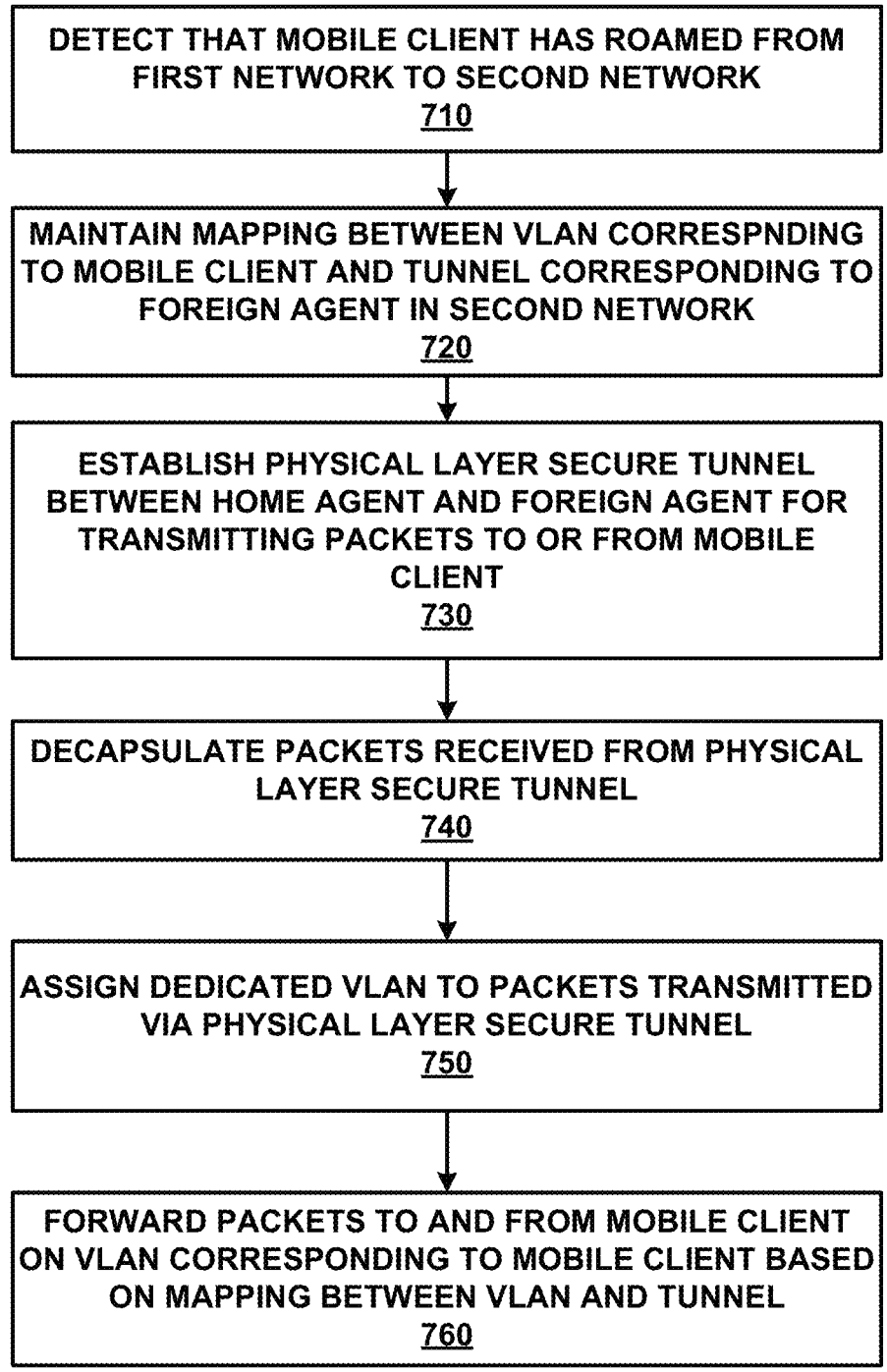
FIG. 7 is a flowchart illustrating an exemplary home VLAN identification process for roaming mobile clients according to embodiments of the present disclosure.

FIG. 7 is a flowchart illustrating exemplary process of home VLAN identification for roaming mobile clients.

During operations, the disclosed network device serving as the home agent for a mobile client first detects that the mobile client has roamed away from a first network to a second network (operation 710). Also, the network device maintains a mapping between a VLAN corresponding to the mobile client and a tunnel corresponding to a foreign agent in the second network (operation 720). In some embodiments, the network device receives from the foreign agent a home agent discovery request including the MAC address of the mobile client. In response to the home agent discovery request, the network device modifies the bridge table to include the mapping between the VLAN corresponding to the mobile client and the tunnel corresponding to a foreign agent in the second network.

Then, the network device establishes a physical layer secure tunnel (e.g., a layer 2 GRE tunnel) between the home agent and the foreign agent for transmitting packets to or from the mobile client (operation 730). Furthermore, the network device decapsulates packets received from the physical layer secure tunnel (operation 740), and assigns a dedicated VLAN to packets transmitted via the physical layer secure tunnel (operation 750). Note that, in some embodiments, traffic to and from different mobile clients associated with the same foreign agent may be transmitted via the same physical layer secure tunnel. In order to assign the dedicated VLAN, the network device identifies the VLAN, which was assigned to the mobile client at the home agent prior to the mobile client roamed away from the home agent, based on the mapping between the VLAN and the tunnel via which the packets are received. The mapping may be stored in a bridge table at the home agent. The network device then overwrites the VLAN identifier value in the packet received via the physical layer secure tunnel with a VLAN identifier value corresponding to the identified VLAN.

Subsequently, the network device forwards the packets to or from the mobile client on the VLAN based on the mapping between the VLAN and the tunnel via which the packets are received.

Systems for Home VLAN Identification for Roaming Mobile Clients

Figure 8:
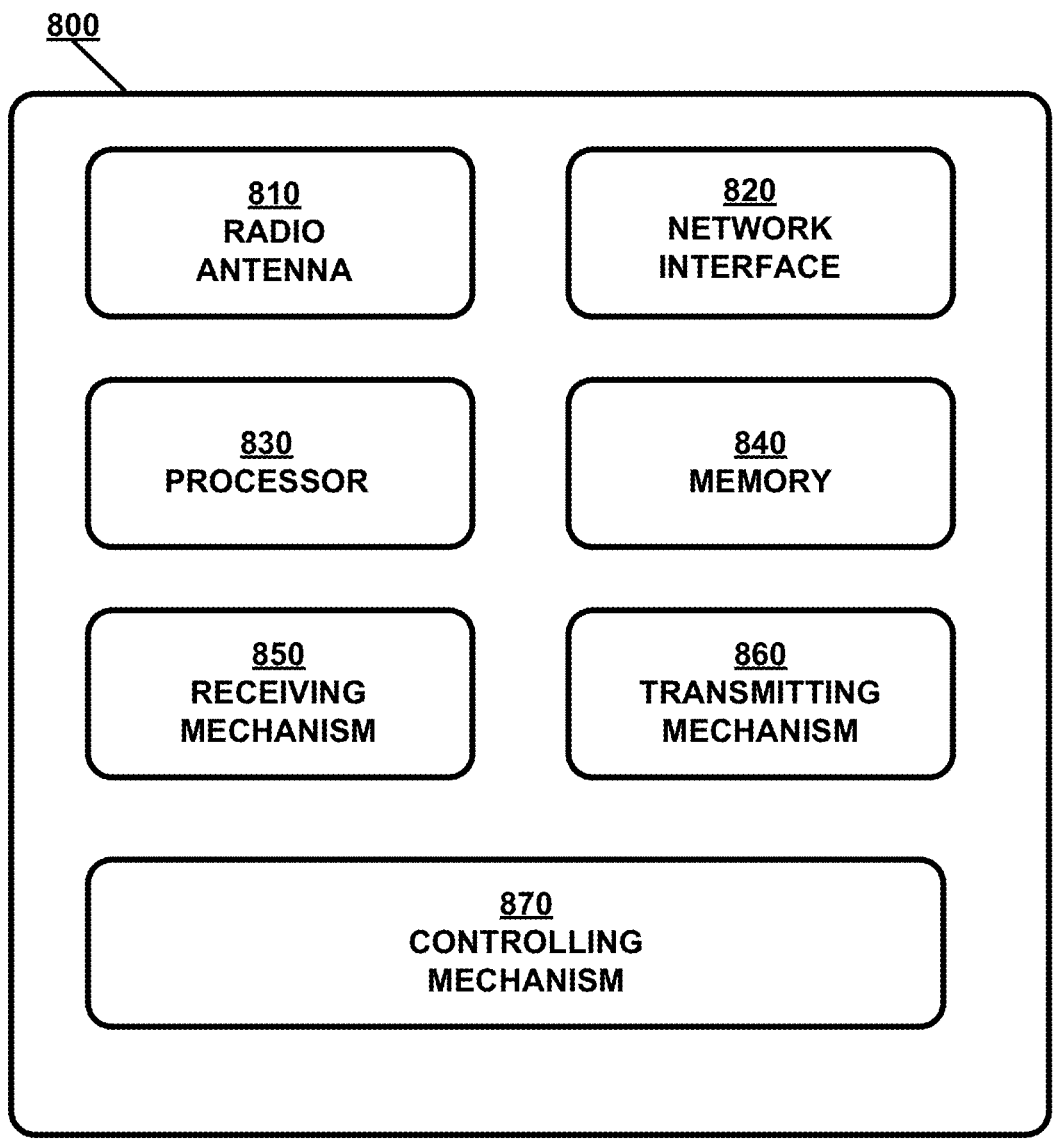
FIG. 8 is a block diagram illustrating an exemplary system for home VLAN identification for roaming mobile clients according to embodiments of the present disclosure.

FIG. 8 is a block diagram illustrating a network device system for home VLAN identification for roaming mobile clients according to embodiments of the present disclosure.

Network device 800 includes at least a network interface 820 capable of communicating to a wired or wireless network, a processor 830 capable of processing computing instructions, a memory 840 capable of storing instructions and data, and optionally one or more radio antennas 810 capable of either transmitting or receiving radio signals or both. Moreover, network device 800 further includes a receiving mechanism 850, a transmitting mechanism 860, and a controlling mechanism 870, all of which are coupled to processor 830 and memory 840 in network device 800. Network device 800 may be used as a client system, or a server system, or may serve as node in a distributed or a cloud computing environment.

Radio antenna 810 may be any combination of known or conventional electrical components for receipt of signaling, including but not limited to, transistors, capacitors, resistors, multiplexers, wiring, registers, diodes or any other electrical components known or later become known.

Network interface 820 can be any communication interface, which includes but is not limited to, a modem, token ring interface, Ethernet interface, wireless IEEE 802.11 interface (e.g., IEEE 802.11n, IEEE 802.11ac, etc), cellular wireless interface, satellite transmission interface, or any other interface for coupling network devices. In some embodiments, network interface 820 may be software-defined and programmable, for example, via an Application Programming Interface (API), and thus allowing for remote control of the network device 800.

Processor 830 can include one or more microprocessors and/or network processors. Memory 840 can include storage components, such as, Dynamic Random Access Memory (DRAM), Static Random Access Memory (SRAM), etc.

Receiving mechanism 850 generally receives one or more network messages via network interface 820 from a distribution system or radio antenna 810 from a wireless client over a wireless communication channel. The received network messages may include, but are not limited to, requests and/or responses, beacon frames, management frames, control path frames, and so on. Each message may comprise one or more data packets, for example, in the form of IP packets. In some embodiments, receiving mechanism 850 receives from the foreign agent a home agent discovery request including the Media Access Control (MAC) address of the mobile client.

Transmitting mechanism 860 generally transmits messages, which include, but are not limited to, requests and/or responses, beacon frames, management frames, control path frames, and so on.

Controlling mechanism 870 generally generates statistical information of packet transmission data. Specifically, controlling mechanism 870 detects that the mobile client has roamed away from a first network to a second network, maintains a mapping between a virtual local area network (VLAN) corresponding to the mobile client and a tunnel corresponding to a foreign agent in the second network, and forwards packets to or from the mobile client on the VLAN based on the mapping between the VLAN and the tunnel via which the packets are received.

In some embodiments, controlling mechanism 870 establishes a physical layer secure tunnel between the home agent and the foreign agent for transmitting the packets to or from the mobile client. Note that, the packets to or from the mobile client transmitted over the physical layer secure tunnel do not identify the VLAN assigned to the mobile client when the mobile client was associated with the home agent.

In some embodiments, controlling mechanism 870 decapsulates packets received from the physical layer secure tunnel, and assigns a dedicated VLAN to packets transmitted via the physical layer secure tunnel. Moreover, controlling mechanism 870 may assign the dedicated VLAN by identifying the VLAN assigned to the mobile client at the home agent based on the mapping between the VLAN and the tunnel via which the packets are received, and overwriting VLAN identifier values in the packets with a VLAN identifier value corresponding to the identified VLAN. In one embodiment, the mapping between the VLAN and the tunnel is maintained in a bridge table at the home agent. The bridge table includes at least a Media Access Control (MAC) address corresponding to the mobile client, a VLAN identifier, and a tunnel identifier.

In some embodiments, in response to receiving mechanism 850 receiving the home agent discovery request, controlling mechanism 870 modifies the bridge table to include the mapping between the virtual local area network (VLAN) corresponding to the mobile client and the tunnel corresponding to a foreign agent in the second network.

Therefore, receiving mechanism 850, transmitting mechanism 860, and controlling mechanism 870 often collectively operate with each other to provide for home VLAN identification for roaming mobile clients. Moreover, in some embodiments, the home agent and the foreign agent are managed by the same control device. In other embodiments, the home agent is managed by a first control device in a mobility domain, and the foreign agent is managed by a second control device in the same mobility domain. The home agent and the foreign agent may be managed by the same master control device or different master control devices. When the home agent and the foreign agent are managed by different master control devices, they may be configured with different VLAN policies. It is important to note that, with the solution provided herein, the home agent and the foreign agent do not need to change, resolve, or merge their VLAN policy configurations.

According to embodiments of the present disclosure, network services provided by network device 800, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A computer implemented method, comprising:
   determining, by a network device, that a mobile client has roamed from a home network to a foreign network, wherein the home network is associated with a home agent for the mobile client, wherein the foreign network is associated with a foreign agent for the mobile client, and wherein the network device serves as the home agent;
   establishing a tunnel associated with a data connection between the home agent and the foreign agent, wherein the tunnel corresponds to a virtual local area network (VLAN) used for transmitting packets to or from the mobile client, and wherein the tunnel has a tunnel identifier and the VLAN has a VLAN identifier;
   maintaining a map between the mobile client and the tunnel, wherein the map is maintained in a bridge table that includes the VLAN identifier, the tunnel identifier, and a Media Access Control (MAC) address corresponding to the mobile client;
   receiving a packet;
   using the map to associate the tunnel with the packet; and
   forwarding the packet using the map.

2. The method of claim 1, wherein receiving the packet includes receiving the packet using the tunnel.

3. The method of claim 2, further comprising:
   decapsulating the packet.

4. The method of claim 2, further comprising:
   overwriting a VLAN identifier value of the packet, wherein the VLAN identifier value of the packet is overwritten with an assigned VLAN identifier value associated with the home agent for the mobile client.

5. The method of claim 4, wherein overwriting includes looking up the assigned VLAN identifier value in the bridge table.

6. The method of claim 1, wherein the tunnel is a secure tunnel.

7. The method of claim 1, wherein forwarding includes assigning a VLAN identifier value to the packet, and wherein forwarding includes forwarding the packet using the secure tunnel.

8. The method of claim 1, further comprising:
   receiving a home agent discovery request, wherein the home agent discovery request includes the MAC address corresponding to the mobile client; and
   modifying the bridge table to associate the VLAN identifier with the tunnel identifier.

9. A system comprising:
   one or more processors; and
   a non-transitory computer readable storage medium communicatively coupled to the one or more processors, wherein the non-transitory computer readable storage medium includes instructions that, when executed by the one or more processors, cause the one or more processors to perform operations including:
      determining, by a network device, that a mobile client has roamed from a home network to a foreign network, wherein the home network is associated with a home agent for the mobile client, wherein the foreign network is associated with a foreign agent for the mobile client, and wherein the network device serves as the home agent;
      establishing a tunnel associated with a data connection between the home agent and the foreign agent, wherein the tunnel corresponds to a virtual local area network (VLAN) used for transmitting packets to or from the mobile client, and wherein the tunnel has a tunnel identifier and the VLAN has a VLAN identifier;
      maintaining a map between the mobile client and the tunnel, wherein the map is maintained in a bridge table that includes the VLAN identifier, the tunnel identifier, and a Media Access Control (MAC) address corresponding to the mobile client;

receiving a packet;

using the map to associate the tunnel with the packet; and forwarding the packet using the map.

10. The system of claim 9, wherein receiving the packet includes receiving the packet using the tunnel.

11. The system of claim 10, wherein the operations further include:

decapsulating the packet.

12. The system of claim 10, wherein the operations further include:

overwriting a VLAN identifier value of the packet, wherein the VLAN identifier value of the packet is overwritten with an assigned VLAN identifier value associated with the home agent for the mobile client.

13. The system of claim 12, wherein overwriting includes looking up the assigned VLAN identifier value in the bridge table.

14. The system of claim 9, wherein the tunnel is a secure tunnel.

15. The system of claim 9, wherein forwarding includes assigning a VLAN identifier value to the packet, and wherein forwarding includes forwarding the packet using the secure tunnel.

16. The system of claim 9, wherein the operations further include:

receiving a home agent discovery request, wherein the home agent discovery request includes the MAC address corresponding to the mobile client; and modifying the bridge table to associate the VLAN identifier with the tunnel identifier.

17. A non-transitory computer readable medium comprising instructions that, when executed by one or more processors, cause the one or more processors to perform operations including:

determining, by a network device, that a mobile client has roamed from a home network to a foreign network, wherein the home network is associated with a home agent for the mobile client, wherein the foreign network is associated with a foreign agent for the mobile client, and wherein the network device serves as the home agent;

establishing a tunnel associated with a data connection between the home agent and the foreign agent, wherein the tunnel corresponds to a virtual local area network (VLAN) used for transmitting packets to or from the mobile client, and wherein the tunnel has a tunnel identifier and the VLAN has a VLAN identifier;

maintaining a map between the mobile client and the tunnel, wherein the map is maintained in a bridge table that includes the VLAN identifier, the tunnel identifier, and a Media Access Control (MAC) address corresponding to the mobile client;

receiving a packet;

using the map to associate the tunnel with the packet; and forwarding the packet using the map.

18. The non-transitory computer readable medium of claim 17, wherein receiving the packet includes receiving the packet using the tunnel.

19. The non-transitory computer readable medium of claim 18, further comprising instructions that, when executed by the one or more processors, cause the one or more processors to perform operations including:

decapsulating the packet.

20. The non-transitory computer readable medium of claim 18, further comprising instructions that, when executed by the one or more processors, cause the one or more processors to perform operations including:

overwriting a VLAN identifier value of the packet, wherein the VLAN identifier value of the packet is overwritten with an assigned VLAN identifier value associated with the home agent for the mobile client.

21. The non-transitory computer readable medium of claim 20, wherein overwriting includes looking up the assigned VLAN identifier value in the bridge table.

22. The non-transitory computer readable medium of claim 17, wherein the tunnel is a secure tunnel.

23. The non-transitory computer readable medium of claim 17, wherein forwarding includes assigning a VLAN identifier value to the packet, and wherein forwarding includes forwarding the packet using the secure tunnel.

24. The non-transitory computer readable medium of claim 17, further comprising instructions that, when executed by the one or more processors, cause the one or more processors to perform operations including:

receiving a home agent discovery request, wherein the home agent discovery request includes the MAC address corresponding to the mobile client; and modifying the bridge table to associate the VLAN identifier with the tunnel identifier.

\* \* \* \* \*